United States Patent Office 2,734,627
Patented Feb. 14, 1956

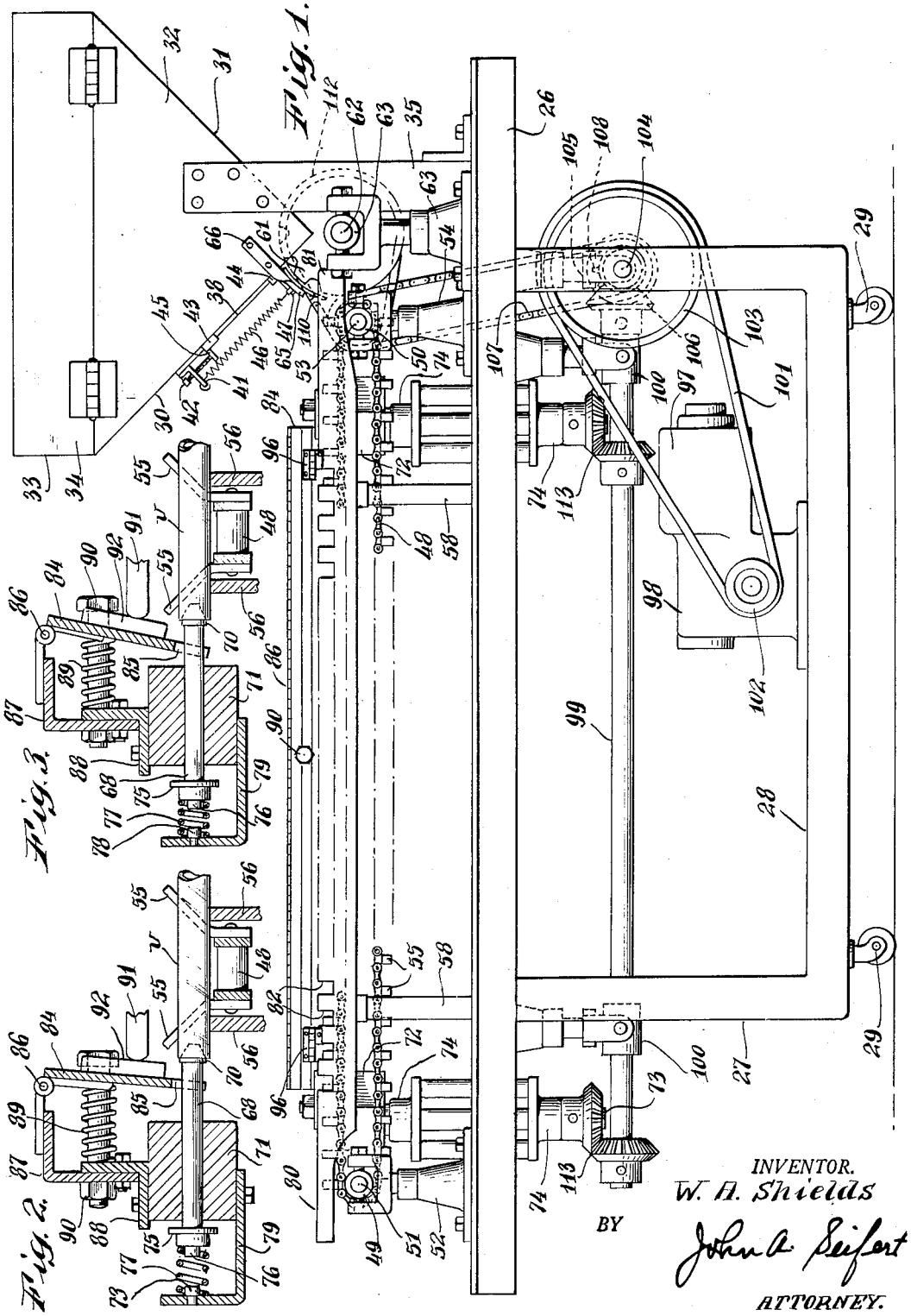

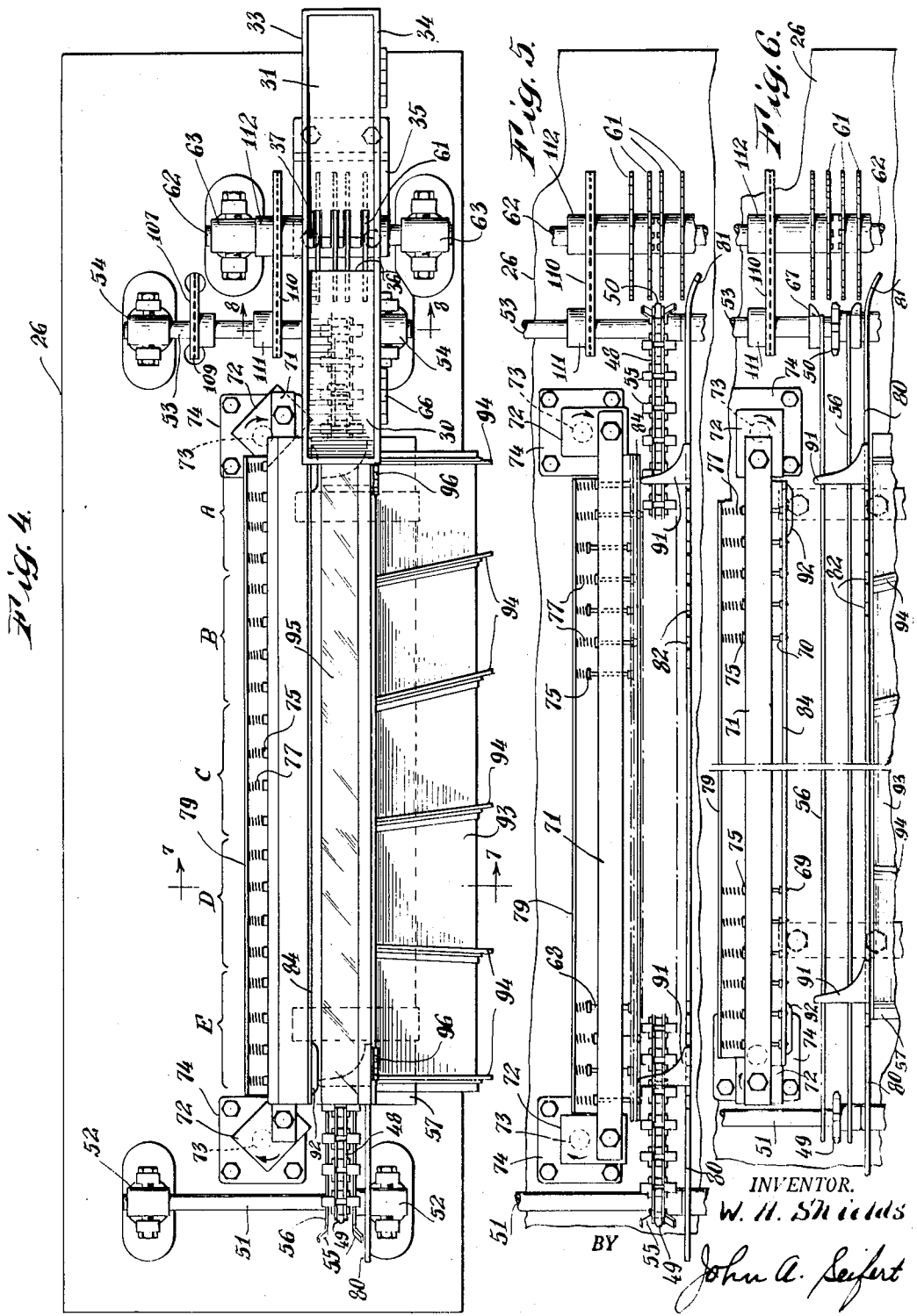

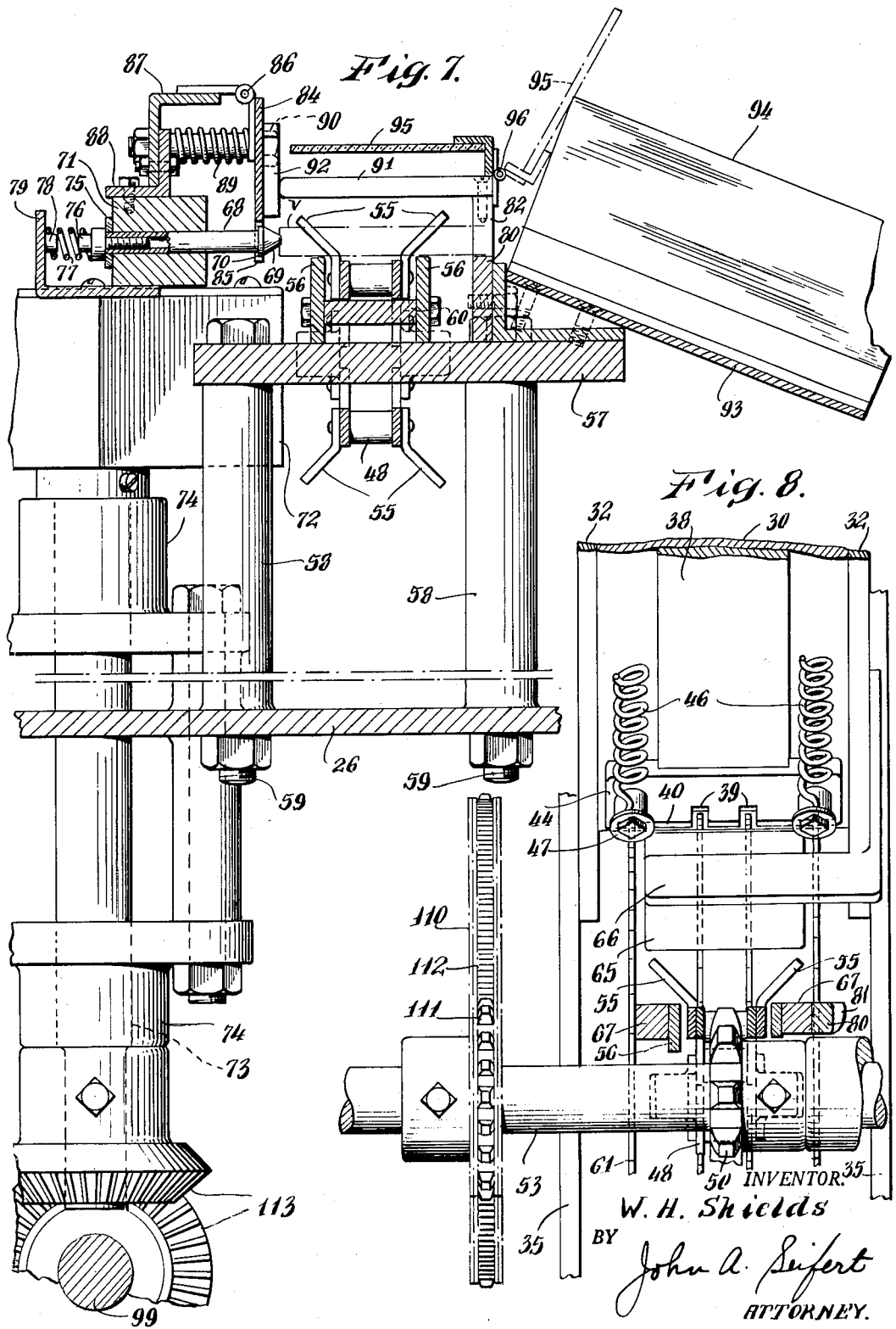

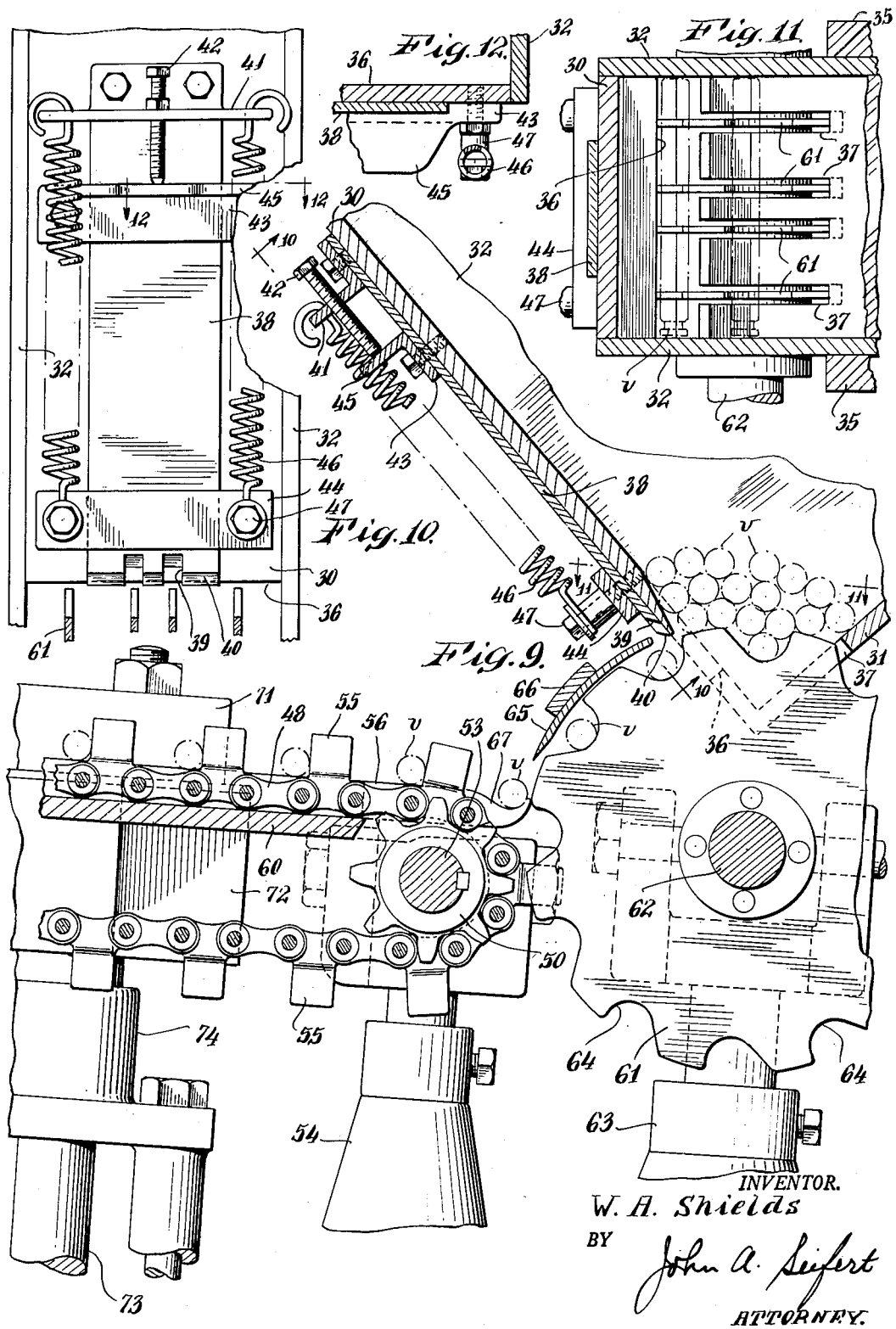

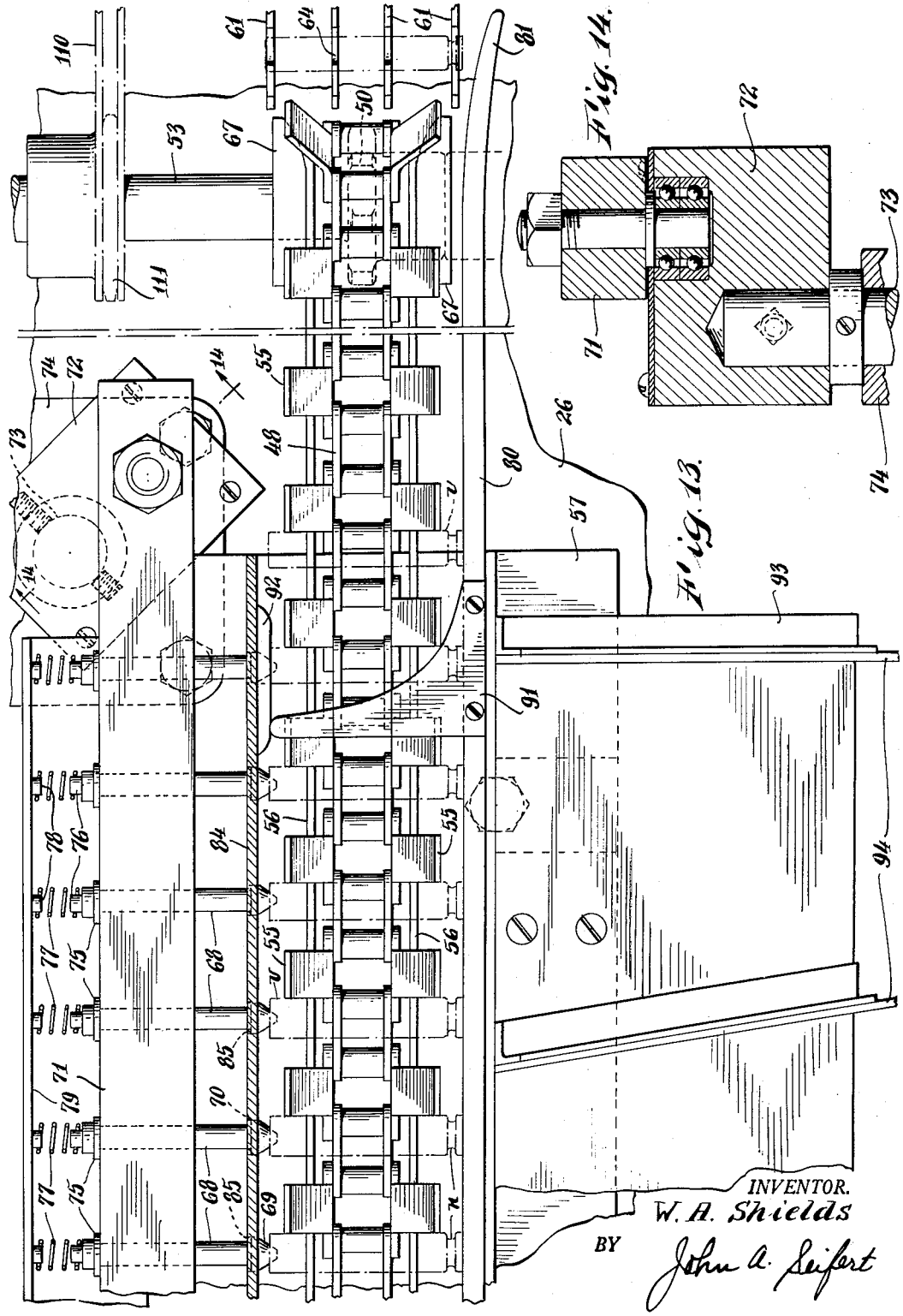

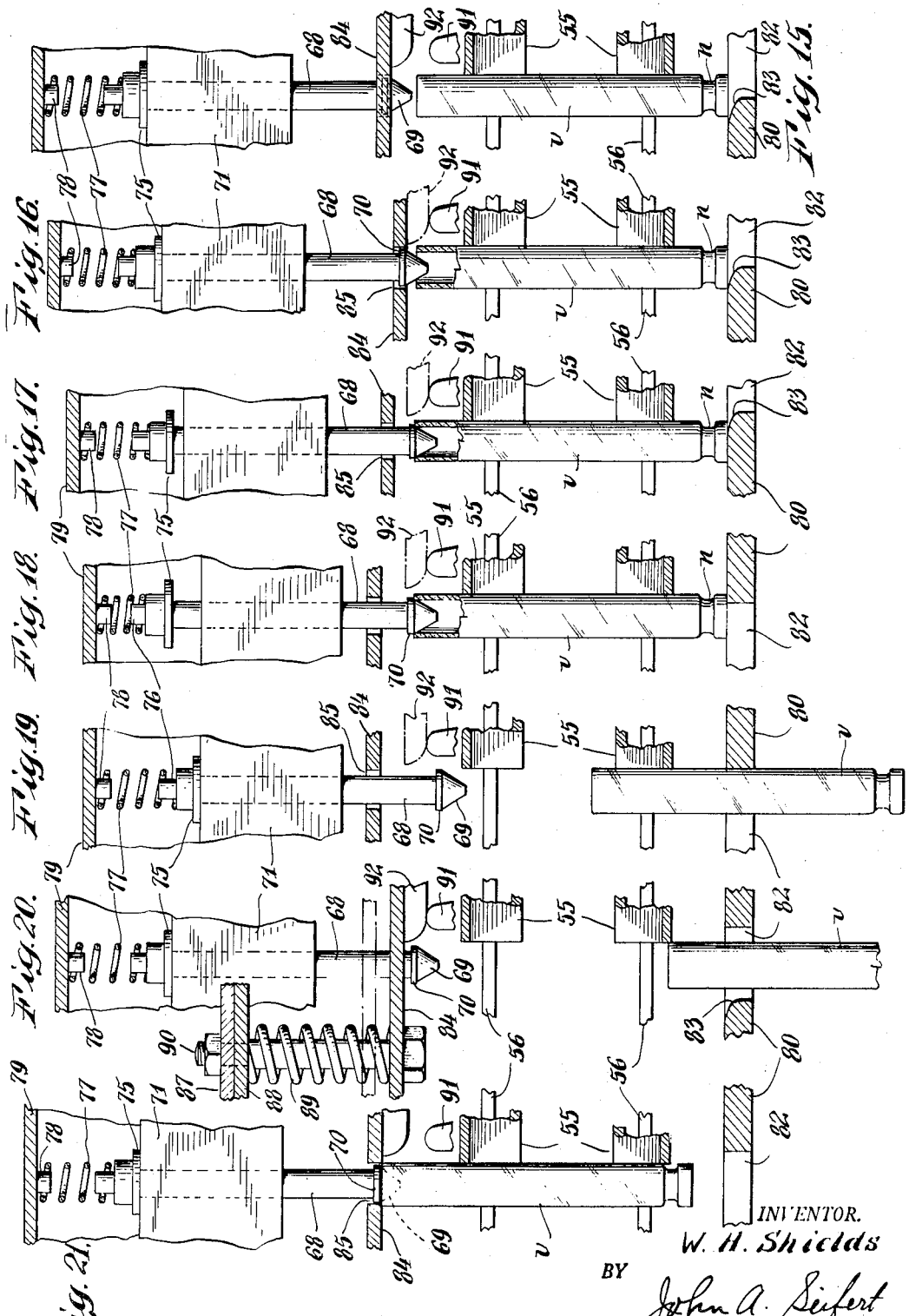

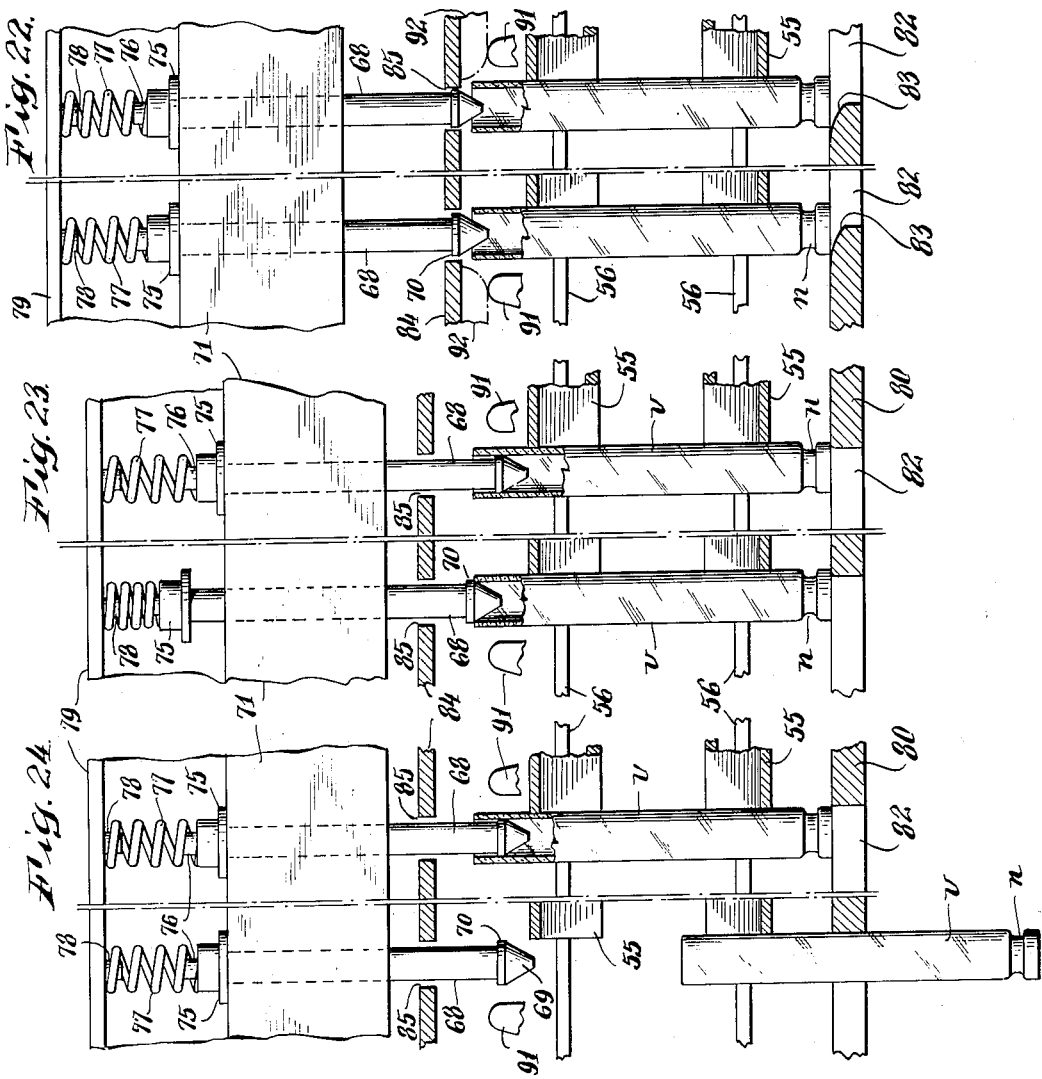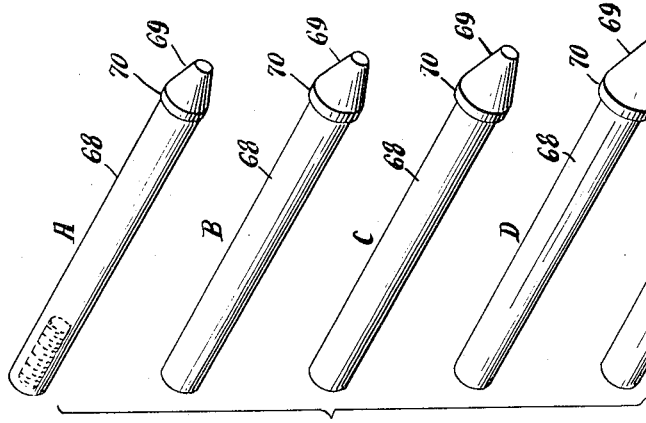

2,734,627

APPARATUS FOR SORTING TUBULAR GLASS ARTICLES OF DIFFERENT INTERNAL DIAMETERS

Walter A. Shields, Jamaica, N. Y.

Application August 1, 1951, Serial No. 239,658

14 Claims. (Cl. 209—88)

This invention relates to apparatus for sorting tubular glass articles, such as vials for containing medicament, of different internal diameters whereby tubular glass articles of the same internal diameter are collected and stored in groups.

Prior to this invention it has been customary to individually gage the vials by hand which was a time and money consuming operation.

It is an object of this invention to provide automatic apparatus for continuously sorting vials of different internal diameters whereby the cost and time required for said operation are greatly reduced.

It is another object of the invention to provide novel arrangement and operation of a conveyor for vials and gages whereby the vials are sorted and ejected from the conveyer by the gages during the continuous travel of the conveyer.

It is another object of the invention to provide a stripper plate operated by the movement of the gages from the vials to strip the vials from the gages.

It is another object of the invention to provide novel means for continuously transferring vials from a hopper to the conveyer.

It is a further object of the invention to provide a guide plate for maintaining the vials on the conveyer in proper position for engagement by the gages and placing the vials under compression when engaged by the proper gages.

A further object of the invention is to arrange the gages in groups of progressively increasing sizes.

Other objects and advantages of the invention will be set forth hereinafter.

In the drawings accompanying and forming a part of this application;

Figure 1 is an elevational view of the apparatus constituting the embodiment of the invention.

Figures 2 and 3 are fragmentary-sectional views, on an enlarged scale, showing the progressive positioning of the stripper plate during the progressive movement of a gage carrier toward the conveyer with a gage engaging a vial having an internal diameter smaller than the gage and placing said gage under compression.

Figure 4 is a plan view of the apparatus showing the gages in their initial position of engaging the vials positioned on the conveyer.

Figure 5 is a fragmentary plan view of the apparatus showing the gages in full engagement with the vials positioned on the conveyer.

Figure 6 is a fragmentary plan view of the apparatus showing the gages being moved from the vials positioned on the conveyer.

Figure 7 is a cross-sectional view, on an enlarged scale, taken on the line 7—7 of Figure 4 showing the relative positions of the gage carrier, gage, stripper plate and the vial positioned on the conveyer.

Figure 8 is a fragmentary-sectional view, on an enlarged scale, taken substantially on the line 8—8 of Figure 4 looking in the direction of the arrows.

Figure 9 is a fragmentary-sectional view in elevation, on an enlarged scale, of the means for transferring vials from the hopper to the conveyer.

Figure 10 is a view of an adjustable sorting plate on the hopper looking from the line 10—10 of Figure 9.

Figure 11 is a cross-sectional view taken on the line 11—11 of Figure 9 looking in the direction of the arrows.

Figure 12 is a fragmentary-sectional view taken on the line 12—12 of Figure 10 looking in the direction of the arrows.

Figure 13 is a fragmentary plan view, on an enlarged scale, showing the position of the gages shown in Figure 4.

Figure 14 is a sectional view taken on the line 14—14 of Figure 13 looking in the direction of the arrows of an eccentric for imparting reciprocatory movement in a circular path to the gage carrier and the gages.

Figures 15 to 21, inclusive, are plan views showing progressive positions of a gage, the gage carrier and stripper plate in ejecting a vial having a smaller internal diameter than the gage from the conveyer.

Figures 22 to 24, inclusive, are plan views showing the principal progressive positions of two different size gages relative to a vial of the same internal diameter, the smaller gage permitting the vial to remain on the conveyer and the larger gage ejecting the vial from the conveyer.

Figure 25 is a perspective view of the different size gages used in the apparatus.

The embodiment of the invention illustrated in the accompanying drawings comprises a table top 26 supported by legs 27 upon a base 28 movably supported by casters 29, as shown in Figure 1.

One end portion of the table top 26 supports a hopper for vials, said hopper comprising converging bottom walls 30 and 31 connected at the sides by vertical straight walls 32, and an open rectangular top portion 33 having a side wall 34 hingedly mounted on a wall 32 to facilitate loading the hopper with vials. The hopper is mounted in elevated position on the table top 26 by a standard 35 secured at the opposite end portions to the table top 26 and walls 32. The bottom wall 30 is provided with a discharge opening 36 adjacent to the juncture with the bottom wall 31 and the bottom wall 31 is provided with spaced slots 37 adjacent to said juncture or point of convergence for a purpose to be hereinafter described. The discharge of the vials from the hopper is controlled or regulated by a sorting plate 38 having slots 39 extending into one end arranged with a beveled edge 40. The opposite end of the plate 38 is provided with a lateral flange 41 and an abutment in the form of a screw 42 adjustably mounted in said flange, as shown in Figures 1, 9 and 10. The plate 38 is slidably mounted on the exterior of the hopper wall 30 by two transverse guide members 43 and 44 having a channel in the underface and secured at the opposite ends to the hopper wall 30. The guide member 43 is mounted adjacent to the lower face of the lateral flange 41 and is arranged with a lateral flange 45 to be engaged by the abutment 42. The abutment 42 is yieldingly urged into engagement with the flange 45 by springs 46 anchored at one end to the flange 41 and at the opposite ends to bolts 47 securing the member 44 to the hopper wall 30. The abutment 42 is adjusted to vary the position of the beveled edge 40 relative to the discharge opening 36. The springs 46 will permit the sorting plate 38 to be moved from the discharge opening 36 by a jam of vials in the discharge opening 36.

The distance between the side walls 32 of the hopper is slightly greater than the lengths of the tubular glass articles to be sorted by the apparatus. Said glass articles are shown in the present illustration in the form of vials v having the internal diameter extending to one end, constituting the bottom of the vials, and the opposite end restricted by a neck portion n and constituting the top of the vials.

The vials are transferred from the discharge opening to a conveyer comprising an endless belt in the form of a sprocket chain 48 engaged around sprocket wheels 49 and 50. The sprocket wheel 49 is secured on a shaft 51 rotatably supported at the opposite ends in bearings 52 secured to the table top 26. The sprocket wheel 50 is secured on a shaft 53 rotatably supported at the opposite ends in bearings 54 secured on the table top 26, as shown in Figure 4. The vials v are continuously moved in equidistantly spaced relation to each other by the conveyer through pairs of opposed ears 55 secured at one end portion to the opposite ends of adjacent pins of the sprocket chain 48 and the ears having the opposite end portions bent outwardly from the sprocket chain at an obtuse angle, as shown in Figures 2, 3, 7, 8, 9 and 13. The vials are supported in a horizontal plane along the upper stretch of the sprocket chain 48 by a rail 56 mounted in spaced relation to each side of the sprocket chain 57 supported from the table top 26 by tubular posts 58 secured to the platform and table top by bolts 59, as shown in Figures 1, 7 and 9. The upper stretch of the chain 48 is supported in a horizontal plane by a plate 60 spanning the space between the rails 56 and secured at the opposite side edges to said rails, as shown in Figure 7.

The vials are successively transferred from the hopper 30—34 to the conveyer chain 48 by disks 61 secured in spaced relation to each other on a shaft 62 rotatably supported at the opposite ends in bearings 63 secured to the table top 26 with peripheral portions of the disks traveling in the discharge opening 36 in the hopper wall 30, slots 37 of the hopper wall 31 and slots 39 of the sorting plate 38. The peripheral portions of the disks 61 are arranged with equidistantly spaced recesses or notches 64 arranged with an arcuate or curved bottom and a forward wall of greater inclination than the rear wall, as shown in Figure 9. The disks 61 are secured on the shaft 62 with the corresponding recesses 64 in the disks in alignment with each other so that aligned recesses will engage one or more vials v in the hopper, as shown in Figure 9. The excess vials are removed from the recesses by the sorting plate 38 so that only one vial in each series of aligned recesses 64 will be removed from the hopper by the disks 61. The vials upon leaving the discharge opening 36 are retained in the recesses 64 by an arcuate or curved plate 65 extending over the peripheries of the disks 61 from the sorting plate 38 to a point spaced from the conveyer belt 48. The plate 65 is supported by angle-shaped bracket 66 having one angle portion secured to the plate 65 and the other angle portion secured to a side wall 32 of the hopper, as shown in Figures 1, 4, 8 and 9. The space between the plate 65 and the conveyer belt 48 is slightly greater than the exterior diameters of the vials to permit the vials to drop from the recesses 64 to a pair of supports in the form of curved fingers 67 secured to the rails 56 to position a vial in the path of travel of a pair of ears 55 of the conveyer belt 48, as shown in Figure 9.

The vials v on the chain 48 are continuously conveyed past gaging means comprising a series of gages mounted in groups of increasing sizes. Each gage comprises a shank 68 having at one end a conical-shaped head 69 arranged with an annular shoulder 70 at the juncture of the head with the shank and said shoulder constituting the gaging portion of the gage. The gages are slidably mounted in equidistantly spaced relation to each other in a reciprocatory carrier comprising a member or bar 71 pivotally mounted at the opposite ends on eccentrics 72 secured on shafts 73 rotatably supported in bearings 74 secured to the upper and lower faces of the table top 26, as shown in Figures 1, 4, 5, 6, 7, 13 and 14. The eccentrics 72 reciprocate the member 71 in a circular path toward and away from one side of the conveyer 48 in the direction of the arrows in Figures 4, 5 and 6. The heads 69 of the gages extend from one side of the reciprocatory member 71 and the opposite ends of the gage shanks 68 extend from the opposite side of the reciprocatory member and are arranged with shoulders 75 to abut said side of the member 71 and limit movement of the gage heads 69 from said member. Each shoulder 75 is provided on an intermediate portion of a plug removably mounted at one end in a hole in the end of each gage shank 68 opposite the head 69 and the opposite end of the plug is arranged with a spring guide protuberance 76. Each shoulder 75 is yieldingly urged into engagement with the reciprocatory member 71 by a spring 77 engaged at one end on the protuberance 76 and the opposite end engaged on a protuberance of a series of protuberances 78 corresponding to the position and number of the gages in the member 71 and arranged on an abutment comprising an angular bracket 79 having one side portion secured to the bottom of the member 71 and the other side portion arranged with the protuberances 78 and in parallel spaced relation to the member 71. The ends of the abutment bracket 79 terminate within the ends of the reciprocatory member 71, as shown in Figures 4 to 6, inclusive, and participate in the reciprocating movement of said member. The opposite ends of the springs 77 abut the abutment 79 and the plug bodies and urge the gage heads 69 from the member 71 to a position limited by the shoulders 75.

The vials v are stacked in the hopper 30—34 so that the vials are positioned on the conveyer 48 with the bottom ends of the vials juxtaposed to the gage heads 69. Said bottom ends of the vials are retained in predetermined position to the gage heads 69 during the travel of the conveyer by a guide plate 80 mounted on the platform 57 to extend in spaced parallel relation to the side of the upper stretch of the conveyer 48 opposite to the side of the conveyer facing the gages so that the plate 80 will engage the neck ends n of the vials and position the opposite ends of the vials in position to be engaged by the gage heads 69 and gaging shoulders 70. To facilitate the engagement of the neck ends of the vials with the guide plate 80, the end portion of said plate extending relative to the transfer disks 61 is curved outwardly, as shown at 81 in Figures 5, 6, 8 and 13. The guide plate 80 is arranged with a series of spaced openings 82 having corresponding side wall portions beveled, as shown at 83 in Figures 15 to 24, inclusive, for a purpose to be hereinafter described. The plate 80 is mounted in relation to the movement of the reciprocatory member 71 so that the openings 82 are aligned with the gages 68—70 when the member 71 is fully reciprocated toward the conveyer 48 to permit the vials to be ejected by the proper gages from the conveyer 48 through the openings 82. The guide plate 80 will maintain the vial engaged by a gage having a shoulder 70 of greater diameter than the internal diameter of said vial under the force of the spring 77 associated with said gage until the vial is aligned with an opening 82 at which time the vial is ejected by the gage under the force of the spring 77 which has been compressed by the movement of the member 71 toward the conveyer 48 and the engagement of the shoulder 70 with the vial held against longitudinal movement by the guide plate 80.

In the present illustration of the invention, the gages 68—70 are mounted in the member 71 in five groups A, B, C, D and E, Figure 4, of four gages in each group and the gages of each group having the shoulders 70 of the same diameter and the diameters of the shoulders 70 in each group increasing from the portion of the conveyer 48 which receives the vials from the hopper 30—34 to the opposite portion of the conveyer, so that the gages in group A will have the shoulders of the smallest diameter and the gages in group E will have the shoulders of the largest diameter. To better illustrate the groupings of the gages, a gage of each group is shown in Figure 25 with each gage designated by the group designation in which it constitutes a part.

The speed of travel of the conveyor 48 and the speed of rotation of the eccentrics 72 are such that a gage head 69 of each group of gages is moved into and out of the bottom end of each vial during the entire travel of the vial on the upper stretch of the conveyer until said vial is ejected from the conveyer by a gage or is discharged from the conveyer by gravity. This is accomplished by imparting one complete rotation to the eccentrics during the movement of four pairs of ears 55 past a given point in the travel of the upper stretch of the conveyer 48. All vials having internal diameters smaller than the diameters of the shoulders 70 of gages in group A are ejected from the conveyer 48 through an opening 82 in the guide plate 80 before the vials having the internal diameters smaller than the shoulders 70 of the gages of group A reach the group B gages. The gages in group B eject from the conveyer 48 all vials having internal diameters less than the diameters of the shoulders 70 of said gages so that the vials reaching the group C gages will have internal diameters greater than the diameters of the shoulders 70 of the groups A and B gages. The gages in group C eject from the conveyer 48 all vials having internal diameters less than the diameters of the shoulders 70 of said gages in group C so that the vials reaching the group D gages have internal diameters greater than the diameters of the shoulders 70 of the gages in groups A, B and C. The gages in group D eject from the conveyer 48 all vials having internal diameters less than the diameters of the shoulders 70 of said gages so that all vials reaching the group E gages have internal diameters greater than the diameters of the shoulders 70 of the gages in groups A, B, C and D. The gages in group E eject from the conveyer 48 all vials having internal diameters less than the diameters of the shoulders 70 of said gages in group E and the vials having internal diameters greater than the diameters of the shoulders 70 of the gages in group E drop from the conveyer into a suitable depository, not shown, placed on the table top 26 below the sprocket wheel 49.

To prevent the vials from being removed from the conveyer 48 by the gages 68—70 during the movement of the member 71 from the conveyer, there is provided a stripper plate 84 having a series of equidistantly spaced recesses or openings 85 in one longitudinal edge for the passage of the gages and the plate 84 is pivotally mounted at the opposite longitudinal edge by a hinge 86 on a bracket 87 secured to a bracket 88 secured to the top of reciprocatory member 71, as shown in Figures 1, 2, 3 and 7, so that the stripper plate reciprocates with the member 71. The stripper plate is yieldingly urged to extend in parallel spaced relation to the member 71 and the conveyer 48 with the gage shoulders 70 in the openings 85 by a spring 89 coiled around a bolt 90 mounted in the stripper plate 84 and the brackets 87, 88 with the spring between the stripper plate 84 and bracket 88, whereby the plate 84 yieldingly abuts the head of the bolt. The stripper plate is moved toward the member 71 away from the gage shoulders 70 during the movement of the member 71 toward the conveyer 48 to permit free engagement of the shoulders with the vials. This is accomplished by abutments 91 secured at one end to the guide plate 80 and extended over the upper stretch of the conveyer 48 with the opposite end adapted to engage a raised surface 92 on the stripper plate 84. The spring 89 forcedly moves the stripper plate 84 to the gage heads 69 and removes from said heads any vials being withdrawn from the conveyer by said heads when the member 71 moves from the conveyer 48 and the stripper plate 84 moves from the abutments 91, as shown in Figure 21.

The beveled side wall portions 83 of the openings 82 in the guide plate 80 will permit slight longitudinal movement of the vials due to the action of the stripper plate 84.

The sorted vials ejected from the conveyer are guided in groups according to their internal diameters to suitable depositories, not shown, positioned at the side of the table top 26. The sorted vials are guided by individual chutes formed on a plate 93 mounted at one longitudinal side portion on the platform 57 to slope from the openings 82 in the guide plate 80 to a point beyond the side of the table top 26, as shown in Figures 4, 7 and 13. The chutes are formed on the plate 93 by walls 94 extending vertically from the plate 93 and extending at different angles from the guide plate 80 to a point beyond the lower edge of the plate 93. The walls 94 are spaced from each other to form five chutes corresponding to and positioned relative to the five groups A, B, C, D and E of gages 68—70 so that each chute will receive vials having the same internal diameters.

To prevent the vials from flying into the air and injuring the operator of the apparatus due to an inaccurate positioning of the vials relative to the gages, there is provided a protecting shield 95 of transparent material pivotally mounted by hinges 96 on the guide plate 80 to permit adjustment of the plate 95 to a horizontal position over the conveyer 48, as shown in full lines in Figure 7, and to a position away from the conveyer, as shown in broken lines in Figure 7, to permit access to the vials on the conveyor. The transparency of the plate 95 permits observation of the travel of the vials on the conveyer.

As shown in Figure 1, the operating parts of the apparatus are actuated by an electric motor 97 arranged with reducing-gear mechanism 98 mounted on the base 28 and operatively connected to a shaft 99 rotatably supported at the opposite end portions in bearings 100 suspended from the table top 26. The operative connection between the reducing-gear mechanism and the shaft 99 comprises a transmission belt 101 engaged around a pulley 102 on the output shaft of the reducing-gear mechanism and a pulley wheel 103 secured on a shaft 104 rotatably supported in a bearing 105 suspended from the table top 26. The shaft 104 is operatively connected to the shaft 99 through meshing beveled gearing 106 secured to said shaft.

The conveyer belt 48 is continuously actuated by the shaft 104 through a sprocket chain 107 engaged around a sprocket wheel 108 secured on the shaft 104 and a sprocket wheel 109 secured on the shaft 53.

The vial transfer disks 61 are continuously rotated from the shaft 53 by a sprocket chain 110 engaged around a sprocket wheel 111 secured on the shaft 53 and a sprocket wheel 112 secured on the shaft 62, as shown in Figures 1, 4, 5 and 6.

The eccentrics 72 are continuously rotated in the direction of the arrows shown in Figures 4, 5 and 6 by the shaft 99 through meshing beveled gearing 113 secured on the shafts 73 and 99, as shown in Figures 1 and 7.

In the operation of the apparatus, the vials *v* are stacked in the hopper 30—34 through the opening in the side of the rectangular top portion 33 provided by lowering the side wall 34. After the hopper is filled with vials, the wall 34 is raised to close said opening in the rectangular top portion 33. The vials are stacked in the hopper with the neck portions *n* adjacent to the side wall 32 supporting the hinged wall 34. The vials are successively transferred through the discharge opening 36 of the hopper by the disks 61 to the fingers 67 where they are successively picked-up by the ears 55 of the conveyer belt 48 and successively conveyed past the groups A, B, C, D and E of gages 68—70. Each vial on the conveyer belt 48 is successively engaged by a gage 68—70 of each group A, B, C, D and E by the complete rotation of the eccentrics 72 during the travel of four pairs of ears 55 past a given point in the travel of the conveyer belt 48. In Figures 15 to 21, inclusive, there is illustrated the progressive movements of the reciprocatory member 71 toward and away from the conveyer belt 48 and the progressive steps of ejecting a vial from the conveyer belt 48 by a gage 68—70 having a shoulder 70 of a diameter greater than the internal diameter of said vial. In Figure 18, the vial v is under the compression of the spring 77 while being conveyed to an opening 82 in the guide plate 80. Figure 19 shows the vial being ejected from the conveyer belt 48 under said compression by being positioned in register with said opening 82.

In Figures 22 to 24, inclusive, there is illustrated a vial v being gaged by a gage 68—70 in two different groups, such as groups A and B. The internal diameter of said vial is greater than the diameter of the shoulder 70 of the gages in group A but said internal diameter is less than the diameter of the shoulder 70 of the gages 68—70 in group B, so that the vial will remain on the conveyer belt 48 while traveling past the gages in group A and will be ejected from the conveyer belt by one of the gages in group B.

Figure 2 shows in elevation the positions of the parts in Figure 17 and Figure 3 shows in elevation the positions of the parts shown in Figure 18.

It is to be understood that the number of gages in a single group may be changed with corresponding changes in the rate of travel of the conveyer 48 and rotation of the eccentrics 72. The number of groups of gages may also be changed depending upon the number of variations in the internal diameters of the vials being sorted.

Having thus described my invention, I claim:

1. In apparatus for sorting vials of different internal diameters, means for continuously conveying vials in a straight path, a member rotatably mounted adjacent to one side of the conveying means to have reciprocatory movement in a horizontal path toward and away from the conveying means, a series of gages slidably mounted in the reciprocatory member in groups of increasing sizes from one end to the opposite end of the member and yieldingly urged toward the vials on the conveying means to engage one end of said vials and eject vials having internal diameters smaller than the engaging gages from the conveying means by the movement of the reciprocatory member toward the conveying means, and a plate having equidistantly spaced openings and mounted adjacent to the side of the conveying means opposite the side adjacent to the reciprocatory member to engage the ends of the vials opposite the ends engaged by the gages and maintain the vials in position to be engaged by the gages and the vials being ejected from the conveying means by the gages through the openings in said plate.

2. In apparatus for sorting vials of different internal diameters as claimed in claim 1, a stripper plate pivotally supported by the reciprocatory member to extend between said member and the conveying means, a spring to yieldingly urge the stripper plate toward the conveying means, and abutments extending toward the stripper plate to engage and move the stripper plate toward the reciprocatory member during the movement of the reciprocatory member toward the conveying means, the movement of the reciprocatory member from the conveying means disengaging the stripper plate from the abutments and the spring imparting vial stripping movement to the stripper plate during said movement of the reciprocatory member from the conveying means.

3. In apparatus for sorting vials of different internal diameters as claimed in claim 1, a stripper plate having equidistantly spaced openings and pivotally supported by the reciprocatory member to extend between the reciprocatory member and the conveying means with the gages extending into the openings in said stripper plate, a spring to yieldingly urge the stripper plate toward the conveying means, and abutments extending toward the stripper plate to engage and move the stripper plate toward the reciprocatory member under compression during the movement of the reciprocatory member toward the conveying means, the movement of the reciprocatory member from the conveying means disengaging the stripper plate from the abutments and the spring imparting vial stripping movement to the stripper plate during the movement of the reciprocatory member from the conveying means.

4. In apparatus for sorting vials of different internal diameters as claimed in claim 1, a stripper plate pivotally supported by the reciprocatory member to extend between the reciprocatory member and the conveying means, a spring to yieldingly urge the stripper plate toward the conveying means, and abutments supported by the vial positioning plate to extend over the conveying means and engage and move the stripper plate toward the reciprocatory member during the movement of the reciprocatory member toward the conveying means, the movement of the reciprocatory member from the conveying means disengaging the stripper plate from the abutments and the spring imparting vial stripping movement to the stripper plate during said movement of the reciprocatory member from the conveying means.

5. In apparatus for sorting vials of different internal diameters as claimed in claim 1, wherein the conveying means comprises an endless belt having equidistantly spaced pairs of ears to engage and move successive vials, and a rail on each side of the upper stretch of the belt to support the vials being engaged and moved by the pairs of ears.

6. In apparatus for sorting vials of different internal diameters as claimed in claim 1, wherein the reciprocatory member is rotatably mounted by eccentrics rotatably mounted and pivotally connected to the opposite end portions of said member.

7. In apparatus for sorting vials of different internal diameters as claimed in claim 1, wherein each gage comprises a shank slidable in the reciprocatory member, a head at one end of the shank having a tapering face and an annular shoulder adjacent the shank constituting the gaging portion of the gage, and an enlarged portion at the opposite end of the shank to abut the reciprocatory member and limit movement of the head from the reciprocatory member.

8. In apparatus for sorting vials of different internal diameters as claimed in claim 1, wherein the reciprocatory member is arranged with an abutment spaced from one side thereof and participating in the movement of the reciprocatory member, each gage comprises a shank slidable in the reciprocatory member, a head at one end portion of the shank extending from the side of the reciprocatory member opposite the side arranged with the abutment and said head constituting the gaging portion of the gage and an enlarged portion at the opposite end of the shank to abut the side of the reciprocatory member arranged with the abutment and limit the movement of the head from the reciprocatory member, and a spring compressed between the abutment of the reciprocatory member and the enlarged portion of the gage shank to yieldingly urge the gage head from the reciprocatory member toward the conveying means.

9. Apparatus for sorting vials of different internal diameters as claimed in claim 1, wherein one side of the wall of each opening in the plate is beveled.

10. In apparatus for sorting vials of different internal diameters as claimed in claim 1, a shield adjustably supported by the plate and extended over the vials on the conveying means.

11. In apparatus for sorting vials of different internal diameters, a conveyor traveling in a straight horizontal path for transporting a single row of spaced vials extending lengthwise in a horizontal plane, a series of gages yieldingly mounted and reciprocatory in a horizontal path toward and away from one side of the conveyor to engage one end of the vials on the conveyor and eject vials of smaller internal diameter than the gages from the conveyor by the reciprocation of the gages toward the conveyer and the influence of the yielding mountings of the gages, a hopper for the vials mounted in alignment with and above the plane of travel of the conveyor and having a discharge opening in the bottom thereof, spaced disks having equidistantly spaced recesses in the peripheral portions and rotatably mounted in vertical alignment below the discharge opening of the hopper with the recesses of the disks in alignment with each other to support the vials in horizontal planes transversely of the disks, and a plate having spaced slots extending into one end portion of the plate and the plate adjustably mounted on the hopper with said slotted end portion of the plate extending between the disks and the disks traveling in the slots whereby the plate limits one vial in aligned disk recesses.

12. Apparatus for sorting vials of different internal diameters as claimed in claim 11, wherein the plate is yieldingly urged toward the disks.

13. In apparatus for sorting vials of different internal diameters, a conveyor traveling in a straight horizontal path for transporting a single row of spaced vials extending lengthwise in a horizontal plane, a series of gages yieldingly mounted and reciprocatory in a horizontal path toward and away from one side of the conveyor to engage one end of the vials on the conveyor and eject vials of smaller internal diameter than the gages from the conveyor by the reciprocation of the gages toward the conveyor and the influence of the yielding mountings of the gages, a hopper for the vials mounted in alignment with and above the plane of travel of the conveyor and having a discharge opening in the bottom thereof, means traveling in the discharge opening of the hopper and adjacent to the conveyer to successively transfer vials from the hopper to the conveyor, and a finger fixedly mounted on each side of the conveyor to receive successive vials from the vial transferring means and position said vials in the path of travel of the conveyor.

14. In apparatus for sorting vials of different internal diameters, a conveyor traveling in a straight horizontal path for transporting a single row of spaced vials extending lengthwise in a horizontal plane, a series of gages yieldingly mounted and reciprocatory in a horizontal path toward and away from one side of the conveyor to engage one end of the vials on the conveyor and eject vials of smaller internal diameter than the gages from the conveyor by the reciprocation of the gages toward the conveyor and the influence of the yielding mountings of the gages, a hopper for the vials mounted in alignment with and above the plane of travel of the conveyor and arranged with converging bottom walls with a discharge opening in one of said walls adjacent the point of convergence and the other wall adjacent the point of convergence arranged with spaced slots, and means traveling in the discharge opening and the spaced slots and adjacent to the conveyor to successively transfer vials from the hopper to the conveyor.

References Cited in the file of this patent

UNITED STATES PATENTS

| | | |
|---|---|---|
| 1,104,727 | Bell | July 21, 1914 |
| 2,068,797 | Gray | Jan. 26, 1937 |
| 2,091,815 | Hommel | Aug. 31, 1937 |
| 2,355,280 | Dichter | Aug. 8, 1944 |
| 2,451,615 | Flanagan | Oct. 19, 1948 |
| 2,525,050 | Spicer | Oct. 10, 1950 |
| 2,531,317 | Baney | Nov. 21, 1950 |

FOREIGN PATENTS

| | | |
|---|---|---|
| 212,846 | Great Britain | Mar. 20, 1924 |
| 603,270 | Great Britain | June 11, 1948 |
| 643,818 | Great Britain | Sept. 27, 1950 |